2,779,786
PROCESS OF PREPARING 2-SEMICARBAZIDO-ACETIC ACID

John H. Coleman, Norwich, William Hayden, Jr., McDonough, and Charles J. O'Keefe, Norwich, N. Y., assignors, by mesne assignments, to The Norwich Pharmacal Company, Norwich, N. Y., a corporation of New York No Drawing. Application April 17, 1953,
Serial No. 349,542

5 Claims. (Cl. 260—534)

This invention relates to a new chemical compound, 2-semicarbazidoacetic acid, described by the formula:

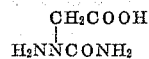

and to a process of preparing the same.

Our new compound is useful as an intermediate in the preparation of pharmacologically effective substances such as N-(5-nitro-2-furfurylidene)-1-aminohydantoin (see U. S. Patent No. 2,610,181). We have discovered that our new compound can be prepared in good yield and in pure form by a process which can be carried out very easily.

In the preparation of our new compound, an aqueous solution of chloroacetic acid is gradually added to a solution of sodium hydroxide in at least 50% hydrazine hydrate, preferably 85% hydrazine hydrate. The rate of addition of the chloroacetic acid solution is such that it takes about one hour. During such addition, the temperature of the reaction solution is maintained in the range of about 90° to about 100° C. Thereafter, the temperature of the solution is maintained in that same range, with stirring, for about one hour to permit full reaction.

The excess of hydrazine hydrate employed in the initial step of our process can be removed and recovered from the reaction mixture through the use of a heat exchange medium, such as mineral oil, polypropylene glycols or polyethylene glycols. The heat exchange medium which we prefer to use is polypropylene glycol 400. We have found that it is a most effective aid for the removal, by distillation at a reduced pressure of about 40–50 mm. and at a temperature of about 50°–60° C., of excess hydrazine hydrate present in the reaction mixture. In this distillation step, water as well as hydrazine hydrate is removed leaving as a residue a crystalline suspension.

It is a feature of our invention that the employment of a heat exchange medium permits substantially complete removal and recovery of hydrazine hydrate, which can then be recycled and which does not contaminate the reaction product. Furthermore, the use of a heat exchange medium reduces salt cake formation, facilitating the handling of the reaction product and shortening the time period necessary for stripping off the excess hydrazine hydrate, which is unstable on prolonged exposure to heat. After removal of the hydrazine hydrate, the reaction product can be separated from the reaction mixture by filtration or, when the heat exchange medium employed is of the preferred water-immiscible type, the addition of water forms an aqueous layer containing the reaction product which can be readily separated.

An aqueous solution containing the dissolved crystalline suspension obtained as described above is treated with a cyanating agent such as an aqueous solution of sodium or potassium cyanate and sufficient acid is added to bring the pH of the solution within the range of about 3 to 9, preferably 6.5 to 7.5. After about two hours, sufficient additional acid is introduced to adjust the reaction mixture to its isoelectric point. Then, upon cooling, our new compound, 2-semicarbazidoacetic acid, is obtained. The crude product thus obtained can be readily purified by dissolving it in water, clarifying by filtration and cooling to precipitate the desired material in pure form.

In order that our invention may be fully available to those skilled in the art, the following illustrative example is given:

Example 1

82 gm. of sodium hydroxide are dissolved in 412 gm. of 85% hydrazine hydrate. The stirred solution is brought to a temperature of 90° C. and a solution of 94.5 gm. of chloroacetic acid in 100 gm. of water is added over a period of approximately one hour while the temperature is held at 90°–100° C. Stirring is continued for an additional hour at this temperature. 600 gm. of polypropylene glycol 400 are then added and the excess hydrazine hydrate and water are distilled from this stirred reaction mixture at approximately 40–50 mm. and 50°–60° C. to leave a crystalline suspension. 300 gm. of water are added and the mixture stirred at 75°–80° C. for several minutes to dissolve the crystalline residue. This temperature is maintained while the layers are allowed to separate. The aqueous layer is drawn off.

160 gm. of water and 65 gm. of potassium cyanate are added to the aqueous solution obtained in the foregoing step. Concentrated hydrochloric acid is added slowly to the stirred mixture so as to establish and maintain a pH of 7.0–7.5 as the reaction proceeds, holding the temperature at 25°–30° C. After two hours, concentrated hydrochloric acid is added to bring to pH 2.4 at 25°–30° C. making the total amount of concentrated hydrochloric acid used approximately 200 gm. The stirred mixture is cooled in an ice bath for two hours and crude 2-semicarbazidoacetic acid is filtered. After drying on the filter, this is dissolved in 300 gm. of water by heating to 80°–90° C., filtered to clarify and the stirred filtrate is cooled in an ice bath for two hours. The crystals are filtered. A yield of 53 gm. (40%) of 2-semicarbazidoacetic acid is obtained. Melting point 174°–175° C. (uncorrected).

What is claimed is:

1. The process of preparing 2-semicarbazidoacetic acid, which comprises gradually adding an aqueous solution of chloroacetic acid to a solution of sodium hydroxide in at least 50% hydrazine hydrate whose temperature is maintained in the range of about 90° to about 100° C. until the reaction is complete, introducing a heat exchange medium into the reaction mixture to distill excess hydrazine hydrate therefrom and to secure a suspension of crystalline material, adding a cyanating agent to an aqueous solution of said crystalline material, adding acid to the cyanating mixture to bring the pH thereof within the range of about 3 to 9, thereafter adjusting the reaction mixture to its isoelectric point, and then separating 2-semicarbazidoacetic acid from the reaction mixture.

2. The process of preparing 2-semicarbazidoacetic acid, which comprises gradually adding an aqueous solution of chloroacetic acid to a solution of sodium hydroxide in 85% hydrazine hydrate whose temperature is maintained in the range of about 90° to about 100° C. until the reaction is complete, introducing a heat exchange medium into the reaction mixture to distill excess hydrazine hydrate therefrom and to secure a suspension of crystalline material, adding a cyanating agent to an aqueous solution of said crystalline material, adding acid to the cyanating mixture to bring the pH thereof within the range of about 3 to 9, thereafter adjusting the reaction mixture to its isoelectric point, and then separating 2-semicarbazidoacetic acid from the reaction mixture.

3. The process of preparing 2-semicarbazidoacetic acid, which comprises gradually adding an aqueous solution of chloroacetic acid to a solution of sodium hydroxide in 85% hydrazine hydrate, maintaining the temperature of the solution in the range of about 90° to about 100° C. during said addition and for about one hour thereafter, introducing a heat exchange medium into the reaction mixture to distill excess hydrazine hydrate therefrom and to secure a suspension of crystalline material, adding a cyanating agent to an aqueous solution of said crystalline material, adding acid to the cyanating mixture to bring the pH thereof within the range of about 3 to 9, thereafter adjusting the reaction mixture to its isoelectric point, and then separating 2-semicarbazidoacetic acid from the reaction mixture.

4. The process of preparing 2-semicarbazidoacetic acid, which comprises gradually adding an aqueous solution of chloroacetic acid to a solution of sodium hydroxide in 85% hydrazine hydrate whose temperature is maintained in the range of about 90° to about 100° C. until the reaction is complete, introducing a heat exchange medium into the reaction mixture to distill excess hydrazine hydrate therefrom and to secure a suspension of crystalline material, adding a cyanating agent to an aqueous solution of said crystalline material, adding acid to the cyanating mixture to bring the pH thereof within the range of about 6.5 to 7.5, then after about 2 hours adding additional acid thereto to adjust the reaction mixture to its isoelectric point, and thereafter separating 2-semicarbazidoacetic acid from the reaction mixture.

5. The process of preparing 2-semicarbazidoacetic acid, which comprises gradually adding an aqueous solution of chloroacetic acid to a solution of sodium hydroxide in 85% hydrazine hydrate whose temperature is maintained in the range of about 90° to about 100° C. until the reaction is complete, introducing a heat exchange medium into the reaction mixture and distilling off excess hydrazine hydrate at a reduced pressure of about 40–50 mm. and at a temperature of about 50°–60° C. to secure a suspension of crystalline material, adding a cyanating agent to an aqueous solution of said crystalline material, adding sufficient concentrated hydrochloric acid to the cyanating mixture to bring the pH thereof within the range of about 6.5 to 7.5 at 25°–30° C., introducing sufficient additional concentrated hydrochloric acid to the reaction mixture after a period of about two hours to bring the pH thereof to about 2.4 at 25°–30° C., and therafter separating 2-semicarbazidoacetic acid from the reaction mixture.

References Cited in the file of this patent

UNITED STATES PATENTS 2,610,181   Hayes _____ Sept. 9, 1952

OTHER REFERENCES

Beilstein: vol. IV, pgs. 556 and 557.
Beilstein: vol. IV, 1st. supp., pgs. 562 and 563.
Bailey et al.: J. A. C. S., vol. 36, pgs. 1747–1766 (1914).